United States Patent [19]

Maxwell et al.

[11] Patent Number: 6,022,920
[45] Date of Patent: Feb. 8, 2000

[54] METHOD FOR THE PRODUCTION OF CLEAR BOTTLES HAVING IMPROVED REHEAT

[75] Inventors: Brian Edison Maxwell, Westfield, Mass.; Philip Edward Gibson, Kingsport, Tenn.

[73] Assignee: Eastman Chemical Company, Kingsport, Tenn.

[21] Appl. No.: 09/232,307

[22] Filed: Jan. 15, 1999

Related U.S. Application Data

[60] Provisional application No. 60/072,365, Jan. 23, 1998.

[51] Int. Cl.⁷ ....................................................... C08K 3/22
[52] U.S. Cl. ............................................. 524/431; 524/435
[58] Field of Search ................................... 524/431, 435; 502/159, 338

[56] References Cited

U.S. PATENT DOCUMENTS

| | | | |
|---|---|---|---|
| 4,250,078 | 2/1981 | McFarlane et al. | 524/242 |
| 4,408,004 | 10/1983 | Pengilly | 524/398 |
| 4,420,581 | 12/1983 | McFarlane et al. | 524/431 |
| 4,481,314 | 11/1984 | Rule | 524/88 |
| 5,278,023 | 1/1994 | Bills et al. | 430/201 |
| 5,419,936 | 5/1995 | Tindale | 524/439 |
| 5,529,744 | 6/1996 | Tindale | 264/532 |
| 5,695,907 | 12/1997 | Chang | 430/201 |
| 5,760,120 | 6/1998 | Itoh et al. | 524/431 |

FOREIGN PATENT DOCUMENTS

| | | |
|---|---|---|
| 0 191 240 | 8/1986 | European Pat. Off. . |
| 2281070 | 11/1990 | Japan . |
| 2 165 547 | 4/1986 | United Kingdom . |

OTHER PUBLICATIONS

Hawley's Condensed Chemical Dictionary, 12th Edition, Van Nostrand Reinhold Company, 1993.

*Primary Examiner*—Vasu Jagannathan
*Assistant Examiner*—Ling-Siu Choi
*Attorney, Agent, or Firm*—Harry J. Gwinnell; Karen A. Harding; Susan F. Wagner

[57] ABSTRACT

Disclosed herein is a thermoplastic polymer composition comprising a blend of a thermoplastic polymer admixed with from about 5 to 50 ppm black iron oxide particles, based on the amount of said thermoplastic polymer. The black iron oxide is admixed with the polymer in order to speed up the process of reheating parisons formed from the polymer during bottle manufacturing. The composition has the beneficial combination of a large percent reheat rate improvement (RIV) with only a small decrease in transparency ($\Delta L^*$). The ratio of RIV/$\Delta L^*$ is significantly better than carbon black—polymer blends having similar RIV.

7 Claims, No Drawings

METHOD FOR THE PRODUCTION OF CLEAR BOTTLES HAVING IMPROVED REHEAT

This patent application claims the benefit of U.S. Provisional Patent Application, Ser. No. 60/072,365, filed Jan. 23, 1998.

FIELD OF THE INVENTION

The present invention relates to the production of clear, colorless thermoplastic polymer having improved reheat. The present invention is particularly useful in the field of beverage bottle manufacturing.

BACKGROUND

Heat lamps used for reheating polymer preforms (parisons) for the commercial manufacture of beverage bottles are typically quartz lamps having a broad light emission spectrum from 500 nm to greater than 1500 nm. The maximum light emission from quartz lamps occurs in the range of about 1100–1200 nm. Polyester, especially polyethylene terephthalate ("PET"), absorbs poorly in the region between 500 and 1400 nm. So in order to speed up the reheat step in bottle production, agents which absorb light in the 700–1200 nm range can be added to the polyester polymer.

A variety of black and gray body absorbing compounds have previously been used as reheat agents to improve the heat up characteristics of polyester under quartz lamps. However, these compounds impart color to polymers. Therefore, the amount of absorbing compounds that can be added to a polymer is limited by its impact on the visual properties of the polymer, such as transparency. Transparency is represented as "L*" in the Gardner Color System, with an L* of 100 representing 100% transparency and an L* of 0 representing 100% opacity. Generally, darker colored reheat agents can be added in only very small quantities because of their negative impact on L*.

Previously disclosed examples of useful polymer reheat agents include carbon black (U.S. Pat. No. 4,408,004) and reduced antimony metal (U.S. Pat. No. 5,419,936 and U.S. Pat. No. 5,529,744). Additionally, U.S. Pat. No. 4,420,581 and U.S. Pat. No. 4,250,078 disclose using red iron oxide as an infrared absorber in polyester containing green dye. The red tint added by the red iron oxide is not problematic in that use because the green dye masks the red tint. While colorless and green beverage bottles have been found to be commercially useful, red tinted bottles have not been marketable. Without the masking presence of a green dye, red iron oxide would cause an undesirable red hue to an otherwise colorless, or neutral hue, polyester bottle.

A more darkly colored absorbing compound generally improves heat up characteristics better than a relatively lighter absorbing compound. However, the more darkly colored absorbing compounds can only be added in very small quantities due to the larger negative impact on L*. For example, when carbon black, a very dark black compound, is added to PET in concentrations greater than a few ppm, bottles blown from that PET are very gray and dull in appearance. Reduced antimony metal can be present in PET in concentrations up to about 50 ppm without having an excessive negative impact on L* because reduced antimony is a gray metal which is much lighter in color than true black body absorbers like carbon black.

U.S. Pat. No. 4,481,314, discloses the use of certain anthraquinone type dyes for the purposes of improving reheat rates. However, these dyes have substantial absorbance in the visible spectrum, resulting in coloration of the polymer. In addition, their relatively low molar extinction coefficients ($\epsilon$) (in the range of 20,000) require the use of relatively large amounts of the dye (20–100 ppm) to the polymer. At a concentration of 50 ppm, the reheat rate improvement was 7%. However, at these levels the polymer displays a light green color which is not suitable for producing clear, neutral hue bottles.

In light of the above, it would be desirable to have an infrared absorber material which can be added to a thermoplastic polymer in a concentration sufficient to effectively increase the reheat rate of the polymer by about 10 percent, yet without deleteriously affecting polymer L* as much as previously known effective polymer reheat agents.

SUMMARY OF THE INVENTION

The present invention is a thermoplastic polymer composition which comprises a blend of a thermoplastic polymer admixed with from about 5 to 50 ppm black iron oxide particles, based on the amount of said thermoplastic polymer.

DETAILED DESCRIPTION OF THE INVENTION

The applicants have found that black iron oxide ($Fe_3O_4$) is a very effective polyester reheat agent when used in a relatively high concentration of up to about 50 ppm. The increase in polymer reheat rate using 50 ppm of black iron oxide is comparable to the increase in polymer reheat rate provided by the addition of merely about 5 ppm black iron oxide. It was found that, despite the fact that a much higher concentration of a black iron oxide must be admixed in a polymer to attain the same increase in reheat rate, the increase in reheat rate is achieved with comparatively less detrimental affect on polymer L* using black iron oxide.

A further benefit of the present invention is that, unlike other black or gray body absorbing compounds, black iron oxide is readily and quantitatively measurable in the resultant polyester composition due to the detectability of iron. This provides a significant improvement in processing and production control over the amount of absorbing agent admixed with the polymer since carbon black and antimony metal cannot be quantitatively distinguished from the other forms of carbon and antimony which are inherently present in polyester.

The present invention is a thermoplastic polymer composition which comprises a blend of a thermoplastic polymer admixed with from about 5 to 50 ppm black iron oxide ($Fe_3O_4$), based on the amount of polymer. An article such as a beverage bottle formed from the present composition will display an L* just slightly lower (less transparent) than the L* of an article formed from the same polymer without the presence of black iron oxide. The present polymer composition has an improved (less) reheat time under a quartz lamp of up to about 15 percent.

The thermoplastic polymer composition of the present invention has an unexpectedly high ratio of reheat rate improvement to transparency change (RIV/$\Delta$L*), when compared to a composition that is the same except for an absence of iron oxide. The percent reheat improvement (RIV) is the improvement in polymer reheat rate after admixing black iron oxide to the polymer. $\Delta$L* is the amount of change in the transparency of the polymer upon admixing the black iron oxide with the polymer. The ratio of RIV to ΔL* for the composition of the present invention is preferably greater than about 2.0, more preferably greater than about 2.5. For comparison, the ratio of RIV to ΔL* for thermoplastic polymer admixed with carbon black is about 1.5. Hence, the ratio of RIV to ΔL* of the composition of the present invention is superior to that of carbon black polymer compositions having similar RIV.

The composition of the present invention is preferably made by admixing black iron oxide particles to the polymer reactant system, during or after polymerization, to the polymer melt, or to the molding powder or pellets from which the bottle parisons are formed. In order to achieve adequate mixing, the black iron oxide should be added to a polymer while at an inherent viscosity (I.V.) of about 0.6 to 0.8 dL/g, measured at 25° C. in a 60/40 wt/wt phenol/tetrachloroethane.

The suitable concentration of black iron oxide in the present polymer composition is between about 5 to 50 ppm, preferably between about 7 to 30 ppm, with a concentration of about 10 to 20 ppm being more preferred. The concentration of black iron oxide is based on the amount of polymer in the composition.

The average particle size of the black iron oxide used in the present invention is preferably between about 0.1 to 10 $\mu$m (micrometers), more preferably between about 0.5 to 5 $\mu$m. The presence of larger particles would cause a bottle formed from the polymer composition to become hazy.

The thermoplastic polymers in the present composition can be any crystallizable thermoplastic homopolymer or copolymer. However, the thermoplastic polymer used in the present invention is most usefully a polyester, particularly a partially aromatic polyester, especially a polyester derived, at least mainly, from an aromatic diacid and an aliphatic diol. The preferred polyester is one which comprises at least 70 mole percent, and more preferably at least 85 mole percent, of units of ethylene terephthalate.

In addition to units derived from terephthalic acid, the acid component of the present polyester may be modified with units derived from one or more additional dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acid units useful for modifying the acid component are units from phthalic acid, isophthalic acid, naphthalene-2,6-dicarboxylic acid, cyclohexanedicarboxylic acid, cyclohexanediacetic acid, diphenyl4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "dicarboxylic acid".

In addition to units derived from ethylene glycol, the diol component of the present polyester may be modified with units from additional diols including cycloaliphatic diols preferably having 6 to 20 carbon atoms and aliphatic diols preferably having 3 to 20 carbon atoms. Examples of such diols include diethylene glycol, triethylene glycol, 1,4-cyclohexanedimethanol, propane-1,3-diol, butane-1,4-diol, pentane-1,5-diol, hexane-1,6-diol,3-methylpentanediol-(2, 4), 2-methylpentanediol-(1,4), 2,2,4-trimethylpentane-diol-(1,3), 2-ethylhexanediol-(1,3), 2,2-diethylpropane-diol-(1, 3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

Polymers of the present invention can be prepared by conventional polymerization procedures well-known in the art. Polyester polycondensation processes include direct condensation of dicarboxylic acid with the diol, ester interchange, and solid state polymerization methods. Typical polyesterification catalysts which may be used include titanium alkoxides, dibutyl tin dilaruate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present.

Other components can be added to the composition of the present invention to enhance the performance properties of the polyester composition. For example, crystallization aids, impact modifiers, surface lubricants, denesting agents, stabilizers, antioxidants, ultraviolet light absorbing agents, metal deactivators, colorants, nucleating agents, acetaldehyde reducing compounds, other reheat reducing aids, fillers and the like can be included. The resin may also contain small amounts of branching agents such as trifunctional or tetrafunctional comonomers such as trimellitic anhydride, trimethylolpropane, pyromellitic dianhydride, pentaerythritol, and other polyester forming polyacids or polyols generally known in the art. All of these additives and many others and their use are well known in the art and do not require extensive discussion. Any of these compounds can be used in the present composition as long as they do not hinder the present invention from accomplishing its objectives. Therefore, it is preferable that the present composition be essentially comprised of a blend of thermoplastic polymer and black iron oxide, with only a modifying amount of other ingredients being present.

The polymer composition of the present invention may be used to form bottle parisons, also known as preforms, which are test tube shaped, injection molded articles. A parison is typically heated to about 10° C. above the glass transition temperature of the polymer composition by passing the parison in front of a bank of quartz infrared heating lamps, positioning the parison in a bottle mold, and then blowing pressurized air through the open end of the mold.

The present invention is illustrated by the examples below. However, the examples should not be interpreted as a limitation on the present invention.

EXAMPLES

Polyethylene terephthalate (PET) polymer compositions were made containing varying levels of black iron oxide (BIO) and carbon black (CB). The relative reheat rates of the polymers were measured as follows:

The polymer samples were injection molded into 3"×3"×0.150" flat plaques. The plaques were set aside for 24 hours to come to ambient temperature. A set of four reference standard plaques and four plaques of each sample material were treated as follows.

A plaque was placed in a wooden holder that only contacted the plaque on the edges. The temperature of the plaque in the holder was measured. This was the initial temperature ($T_i$). The holder was moved into position a fixed distance in front of a tungsten quartz heat lamp identical to those used in reheat blow molding machines. The lamp was tuned to emit light at a temperature of 4,000 degrees Fahrenheit ($\lambda_{max}$ approximately 1,100 nm). The lamp was turned on for 35 seconds. Then the temperature of the plaque was read by an infrared pyrometer. The temperature was read from the face of the plaque which was not illuminated. This was done to allow the heat absorbed by the front surface of the plaque to soak through the plaque. The temperature of the back side of the plaque rises at first to a maximum temperature and then begins to fall slowly as the entire plaque cools. The maximum temperature was recorded as the final temperature ($T_f$).

The temperature rise was recorded as $\Delta T$ ($T_f - T_i$). The change in temperature was also adjusted for small differences in the thickness of the plaques. The adjusted $\Delta T$ was then averaged over the four plaques to give the $\Delta T_{avg}$ for each sample. The $\Delta T_{avg}$ for each sample was divided by the $\Delta T$ of the concurrently tested reference standard to provide the Reheat Index Value (RIV)=($\Delta T_{avg}$ Sample÷$\Delta T_{avg}$ Reference).

Percent Reheat Improvement was calculated as

% Reheat Improvement=(($RIV_{sample}$−$RIV_{control}$)÷$RIV_{control}$)×100

Table 1 below shows that, at equivalent improvements in reheat (RIV), the black iron oxide (BIO) samples displayed better L*, compared to the carbon black (CB) samples. This property is quantified below as RIV/ΔL*.

TABLE 1

| Additive | Conc. (ppm) | RIV | L* | ΔL* | RIV/ΔL* |
|---|---|---|---|---|---|
| BIO Control | 0 | 0.00% | 86.30 | | |
| BIO Control | 0 | 0.00% | 85.81 | 0.00 | |
| BIO | 2 | 0.29% | 85.78 | −0.03 | 9.67 |
| BIO | 5 | 3.17% | 84.54 | −1.27 | 2.50 |
| BIO | 8 | 6.35% | 83.09 | −2.72 | 2.33 |
| CB Control | 0 | 0.00% | 86.60 | | |
| CB Control | 0 | 0.00% | 86.44 | 0.00 | |
| CB | 0.5 | 2.85% | 84.07 | −2.37 | 1.20 |
| CB | 1 | 5.72% | 82.18 | −4.26 | 1.34 |
| CB | 2 | 10.07% | 79.56 | −6.88 | 1.46 |
| CB | 4 | 19.40% | 73.37 | −13.07 | 1.48 |
| Sb Metal | ? | | 83.44 | | |

The results from Table 1 were plotted as a function of reheat additive concentration to predict performance at higher and lower concentrations to determine that the black iron oxide concentration limits of the composition of the present invention are between about 5 to 50 ppm.

We claim:

1. A thermoplastic polymer composition comprising a blend of polyester admixed with from about 5 to 50 ppm black iron oxide particles, based on the amount of said polyester, wherein said composition has a ratio of percent reheat rate improvement to transparency change (RIV/ΔL*) greater than about 2.0, wherein the RIV and ΔL* are determined based on a composition that is the same except for an absence of iron oxide.

2. The composition of claim 1 wherein the concentration of black iron oxide is about 7 to 30 ppm.

3. The composition of claim 1 further wherein said particles have a particle size of about 0.1 to 10 pm.

4. The composition of claim 1 wherein said polyester comprises between about 70 to 100 mole percent repeat units from ethylene terephthalate.

5. The composition of claim 1 wherein said polyester comprises at least 70 mole percent units of ethylene terephthalate.

6. An article selected from the group comprising a preform or a bottle comprising the thermoplastic polymer composition of any one of claims 1–5.

7. A process comprising the steps of forming a preform from the composition of any one of claims 1–5, reheating said preform under a quartz lamp to an appropriate blow molding temperature and blow molding a clear finished article from said preform, wherein said reheating is conducted for a time up to about 15 percent less than for a preform which does not contain said black iron oxide particles.

\* \* \* \* \*